US012172155B2

(12) United States Patent
Bremond et al.

(10) Patent No.: US 12,172,155 B2
(45) Date of Patent: Dec. 24, 2024

(54) EMULSION PRODUCTION MICROFLUIDIC DEVICE

(71) Applicants: PARIS SCIENCES ET LETTRES, Paris (FR); CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

(72) Inventors: Nicolas Bremond, Paris (FR); Jérôme Bibette, Paris (FR); Gwénaëlle Bazin, Houilles (FR)

(73) Assignees: PARIS SCIENCES ET LETTRES, Paris (FR); CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 695 days.

(21) Appl. No.: 17/602,178

(22) PCT Filed: Apr. 8, 2020

(86) PCT No.: PCT/EP2020/060109

§ 371 (c)(1),
(2) Date: Oct. 7, 2021

(87) PCT Pub. No.: WO2020/208121

PCT Pub. Date: Oct. 15, 2020

(65) Prior Publication Data

US 2022/0203354 A1 Jun. 30, 2022

(30) Foreign Application Priority Data

Apr. 12, 2019 (EP) .................................... 19305477

(51) Int. Cl.
*B01L 1/00* (2006.01)
*B01F 23/41* (2022.01)
*B01L 3/00* (2006.01)

(52) U.S. Cl.
CPC ........ *B01L 3/5025* (2013.01); *B01F 23/4105* (2022.01); *B01L 2300/0819* (2013.01); *B01L 2300/0867* (2013.01); *B01L 2300/165* (2013.01)

(58) Field of Classification Search
None
See application file for complete search history.

(56) References Cited

U.S. PATENT DOCUMENTS

2016/0091145 A1 3/2016 Weitz et al.
2016/0271576 A1* 9/2016 Arab ...................... C12Q 1/686

FOREIGN PATENT DOCUMENTS

WO 2004/103539 12/2004
WO 2016/149241 9/2016

OTHER PUBLICATIONS

International Search Report for PCT/EP2020/060109 dated Jun. 2, 2020, 3 pages.

(Continued)

*Primary Examiner* — Jyoti Nagpaul
(74) *Attorney, Agent, or Firm* — NIXON & VANDERHYE

(57) ABSTRACT

Disclosed is an emulsion production microfluidic device which includes: a first channel, including an entry port configured to inject a phase to be dispersed, a second channel, including an entry port configured to inject a continuous phase and an emulsion exit port, and at least one array of microchannels, a height of each of the microchannels being smaller than a height of the first channel; the second channel includes a first part connected to the outlet of each microchannel and at least a second part along the (Continued)

first part, the first part being between the array of micro-channels and the second part, the first part having a height greater that the height of each microchannel, and the second part having a height greater than the height of the first part.

20 Claims, 6 Drawing Sheets

(56) References Cited

OTHER PUBLICATIONS

Written Opinion of the ISA for PCT/EP2020/060109 dated Jun. 2, 2020, 6 pages.

* cited by examiner

Fig.1
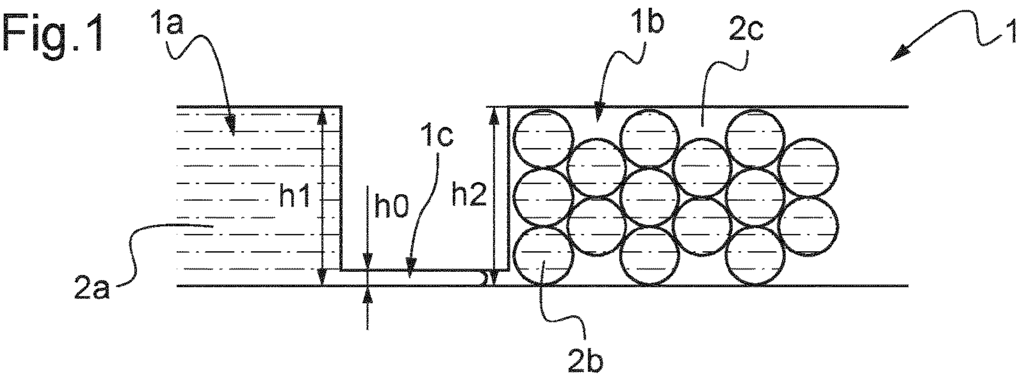
Fig.2A
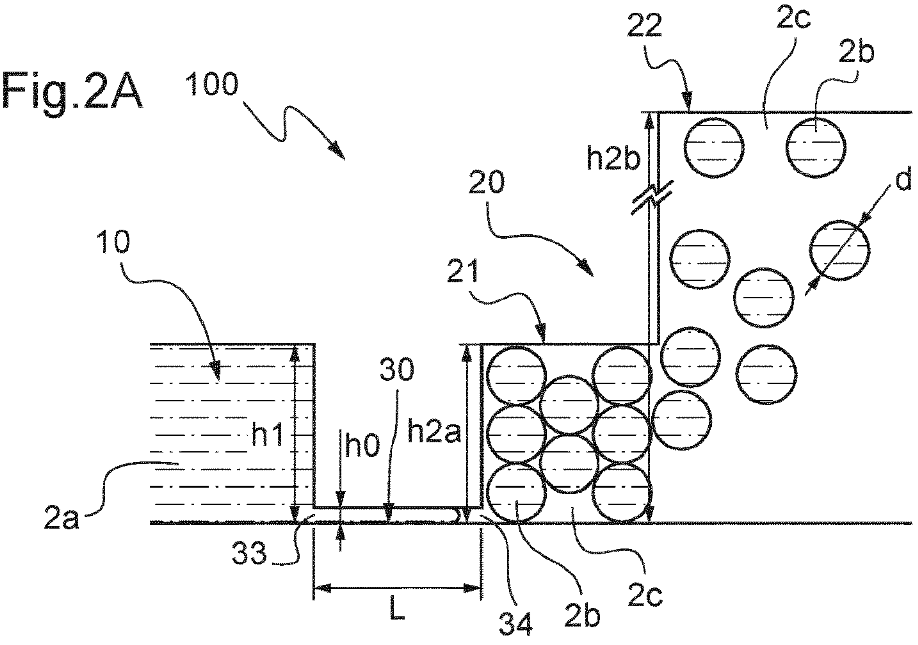
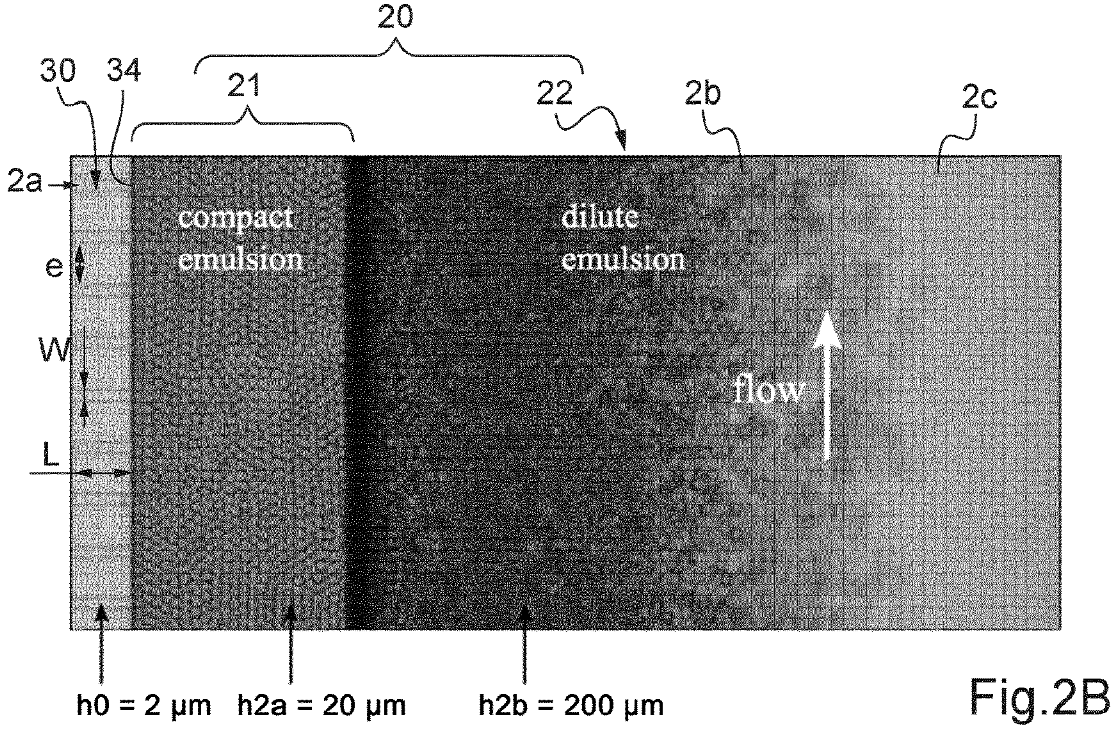
Fig.2B

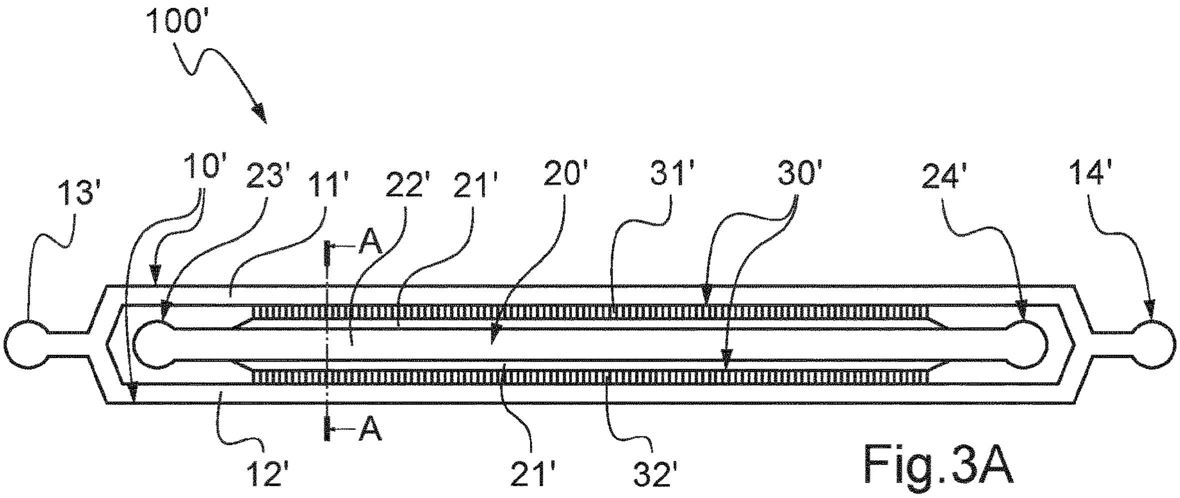
Fig.3A
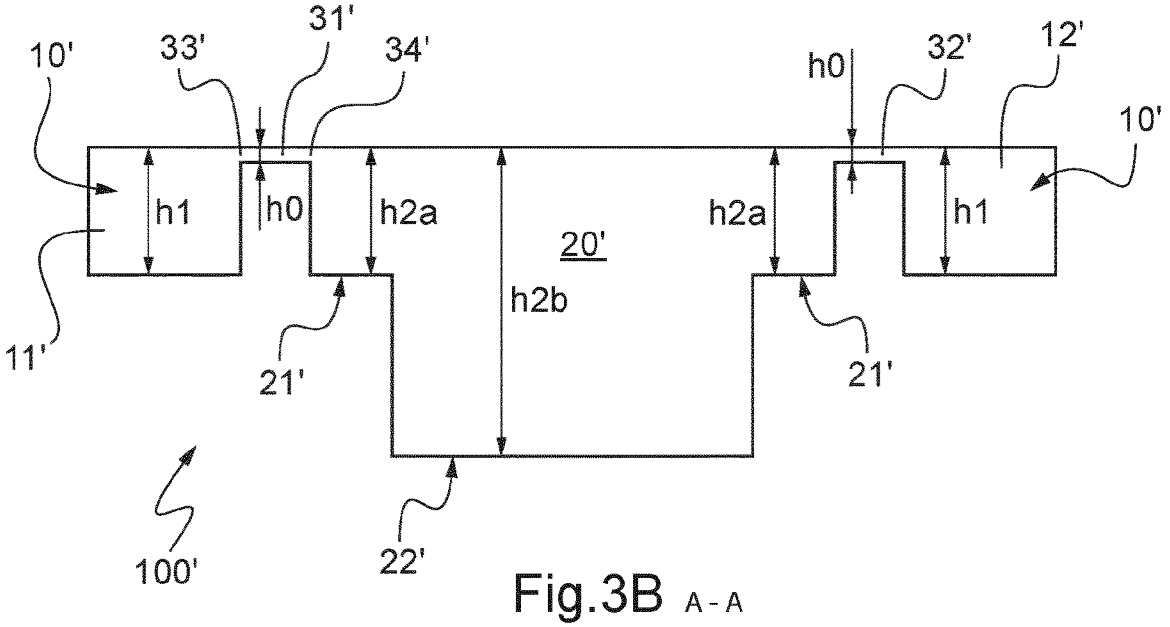
Fig.3B A-A

EMULSION PRODUCTION MICROFLUIDIC DEVICE

This application is the U.S. national phase of International Application No. PCT/EP2020/060109 filed Apr. 8, 2020 which designated the U.S. and claims priority to EP patent application Ser. No. 19/305,477.2 filed Apr. 12, 2019, the entire contents of each of which are hereby incorporated by reference.

TECHNICAL FIELD

The present invention relates to an emulsion production microfluidic device.

BACKGROUND OF THE INVENTION

An emulsion is a mixture of at least two liquids that are normally immiscible. By definition, one liquid (called dispersed phase) is dispersed in another (called continuous phase).

There are two main types of emulsion: a direct emulsion which is like an oil-in-water emulsion, wherein the oil is the dispersed phase and water is the continuous phase, and an inverse emulsion which is like a water-in-oil emulsion, wherein water is the dispersed phase and oil is the continuous phase.

The phase to be dispersed can be a mixture of several miscible fluids, a solution of small molecules, macromolecules, amphiphilic or not, or a dispersion of particles, solid or liquid, the latter thus forming a double, or multiple, emulsion, or a combination of the various above-mentioned options.

The continuous phase generally contains one or more surfactants (amphiphilic molecules), as well as solutes, polymers or even particles.

Emulsification methods to obtain drops of a few micrometers diameter are known, such as an emulsification method by shearing obtained using a device comprising two coaxial cylinders, one of which being rotary, or an emulsification method by a membrane which is based on the use of a porous material through which a phase to be dispersed is injected.

However, these methods lead to emulsion drops characterized by a coefficient of size variation, defined as the ratio between the standard deviation of the drop sizes and the mean drop size, of at least about 15%.

Therefore, microfluidics has appeared an efficient tool for obtaining calibrated emulsion drops.

For example, a microfluidic device is described in U.S. patent application Ser. No. 14/890,817.

In such a device, a phase to be dispersed passes from a first channel to a second channel via microchannels arranged parallel to each other, a height of the microchannels being smaller than that of the channels.

Drops are formed at one end of the microchannels, which meets the second channel in which a continuous phase is injected, transversely to the microchannel network. The size of the drops is proportional to the height of the microchannel, with a smaller dependence on the width of the microchannel. The size of the drops is weakly dependent on the flow rate of the phase to be dispersed in the microchannels, which depends on the pressures on either side of said microchannels, below a critical flow rate. Beyond this critical flow rate, the size of the drops is much larger and leads to a wide size distribution within the microchannel network.

Furthermore, the emulsion drops that are in the second channel are moved by the continuous phase toward an output of the device, to which a tank is connected.

As the microchannels are arranged in series, transversely to the second channel, the amount of drops in the continuous phase increases along the direction of flow of the continuous phase.

An emulsion which is too concentrated could lead to a detrimental effect on the production of this emulsion: increasing the volume fraction of the phase to be dispersed (i.e. the drops) in the continuous phase increases the viscosity of the emulsion and thus the corresponding pressure losses. Besides, adhesion force existing between the drops increases this effect.

For flow control by pressure regulation, the pressure of the continuous phase must then be modulated in order to avoid clogging the device.

However, flow control can be difficult to use for small drop sizes whose rate of production is relatively low. It is often necessary to impose a high flow rate of the continuous phase to sufficiently dilute the emulsion.

Furthermore, the pressure conditions at the first microchannels can be disadvantageous. The flow of the phase to be dispersed through a microchannel depends on the pressure on either side of this microchannel. Increasing the pressure of the continuous phase in order to avoid clogging the device thus amounts to altering, or even stopping, part of the drop production of the microchannels located upstream.

SUMMARY OF THE INVENTION

The invention relates to a microfluidic device for producing emulsions, in which the size of the drops shows great homogeneity, namely a size dispersion coefficient lower than or equal to 15%, or even 10%, and an average size, for example mean size, of a few micrometers, for example which may vary from a few micrometers to a few tens of micrometers, or a few hundred micrometers.

The invention also relates to a microfluidic device, which enables the production conditions of an emulsion to be improved, for example enables continuous and mass production of this emulsion.

Accordingly, the invention provides an emulsion production microfluidic device, which comprises:

- A first channel, comprising an entry port configured to inject a phase to be dispersed into the first channel,
- A second channel, comprising an entry port configured to inject a continuous phase into this second channel, and an emulsion exit port configured to extract an emulsion from the device, and
- At least one array of microchannels, arranged side by side, each microchannel comprising an inlet from the first channel, and an outlet to the second channel, a height h0 of each of the microchannels being smaller than a height h1 of the first channel, the device being characterized in that the second channel comprises a first part connected to the outlet of each microchannel and at least a second part along the first part, the first part being between the array of microchannels and the second part, the first part having a height h2*a* greater that the height h0 of each microchannel, and the second part having a height h2*b* greater than the height h2*a* of the first part.

Thus, the invention decouples the drop formation step (i.e. emulsification step) to constitute the emulsion, thanks to a compact emulsion along the microchannels, and the emulsion collection step owing to a transverse flow for diluting the emulsion and thus facilitate its flow out of the device.

In other words, the second channel is configured to drive a flow, comprising at least the continuous phase, between the entry port and the exit port, and the microchannels are configured to inject a flow of drops of the phase to be dispersed into the second channel, transversely to the flow of the second channel.

The invention allows to homogenize the flows at the outlets of the microchannels and to create a variation of the hydrodynamic resistances between the first and second part of the second channel.

To this end, the invention separates the second channel in two parts: the first part of which is configured to implement the drop formation step out of the microchannels, and the second part of which is configured to implement a drop collection step.

The second channel is characterized by at least two different heights:

The first part, near the microchannels, is characterized by a height h2a a few times greater than that of the microchannels, and The second part, adjacent to the first part, is characterized by at least a height h2b a few times greater than that of the first part.

Such device is also called "closed device" as it comprises an entry port for the phase to be dispersed, an emulsion exit port, and a flow, running in the device, which enables to collect the drops which are formed in the device (i.e. the emulsion is formed in the device).

The height h2a of the first part of the second channel is preferably constant or can slightly vary from the microchannels to the second part, for example increase, but in any case, the height h2a of the first part is significantly greater than the height h0 of the microchannels and the height h2b of the second part of the second channel is significantly greater that the height h2a of the first part.

Here, a lengthwise direction of the device is considered to be the direction of a flow along the second channel between the entry port and the emulsion exit port. Moreover, a width direction of the device is considered to be a direction orthogonal to the lengthwise direction of the device, and a height direction is orthogonal to the lengthwise and width directions.

Furthermore, it is considered that a lengthwise direction of a microchannel is a direction from the inlet to the outlet of the microchannel. A width direction of the microchannel is orthogonal to its lengthwise direction; it extends parallel to the lengthwise direction of the device if the microchannel is perpendicular to the second channel. A height direction of the microchannel is parallel to the height direction of the device.

Same applies to the first channel which has a height direction parallel to the height direction of the device.

The height h0 of at least one microchannel of the array of microchannels is considered as constant.

For example, h0 is equal to about 2 μm.

A microchannel comprises at least a part (along its length) with a constant width W.

According to an example embodiment, a microchannel can comprise a part with an increased width, for example a flared part. Such part is preferably between the part with a constant width and the second channel; i.e. the flared part preferably comprises the outlet of the microchannel.

According to an example embodiment, the parts of at least two microchannels with a constant width W coalesce.

For example, the array of microchannels comprises a part which is common to at least two microchannels, with a same height h0, at the outlet location.

According to one example embodiment, the width W of at least a part of a microchannel is comprised between 0.01 to 10 000 times its height h0.

For example, the width W of at least a part of a microchannel is comprised between 2 and 10 000 times its height h0, for example between 2 and 1 000, or even 100 or even 20 times its height h0, preferably equal to 5 times the height h0.

For example, W is equal to about 10 μm.

For example, microchannels with a constant width along its length of about 10 μm (width)×2 μm (height) are configured to produce drops with a diameter d of about 8 μm.

For example, the width W of at least a part of a microchannel is comprised between 0.01 and 1 time its height h0, preferably between 0.01 and 0.5 time its height h0.

In such a case, owing to certain microfabrication techniques, microchannels can be more high than wide.

According to another example embodiment, a length of a microchannel is comprised between 2 and 1 000 times its height h0, preferably 100 times.

Selection of the length, combined with the height, enables regulation of the hydrodynamic resistance of the microchannel.

For example, a distance e between two successive microchannels is comprised between 2 to 100 times the width W of a microchannel, for example equal to about 4 times the width W of a microchannel.

According to an example embodiment, the microchannels have a cross-section of rectangular shape, or of a half-cylinder shape, or of a triangle shape.

For example, at least one corner of the rectangular cross-section is a right angle, or is curved, for example rounded, or beveled.

According to another example embodiment, at least one of the microchannels can comprise at least one groove along its length. Such a groove eases localisation of drop formation, in particular when the width of the microchannel is very wide, i.e. greater than 20 times its height h0.

For example, the array of microchannels comprises at least 10 microchannels, for example between 100 and 100 000 microchannels, preferably about 1 000 microchannels.

For example, a microfluidic part of the device preferably has a length L0 comprised between 2 cm and 20 cm, a width W0 between 0.5 cm and 10 cm, and a height between 0.1 cm and 2 cm.

The pressure, and thus the flow, of the continuous phase, can be adjusted in order to dilute the emulsion during production as desired, without altering the emulsification process, and this enables optimal production of the emulsion, without intermittence, that is to say continuous production.

As a consequence, the number of microchannels can be increased, compared to a device having a second channel of a single height, which further enhances the production rate.

In such device, a phase to be dispersed is introduced into the first channel via its entry port.

The first channel can optionally also comprise an exit port for the phase to be dispersed which is configured to be open or closed.

When the exit port of the first channel is closed, the phase to be dispersed is forced to pass through the array of microchannels that lead to the second channel. When the exit port of the first channel is open, it is possible to purge the first channel without the need to flow through the array of microchannels.

When the phase to be dispersed passes from the first channel to the first part of the second channel via the microchannels, drops are formed at the end of the microchannels which meets the first part of the second channel.

Simultaneously, the continuous phase is injected into the second channel via its entry port, and moves the drops to the emulsion exit port of the second channel.

More particularly, the continuous phase is injected into the second part of the second channel for example, and spreads in the first part of the second channel.

For example, the second channel can be straight, for example at least between its entry port and its emulsion exit port.

However, the second channel can be tortuous. This can enable a further increase in the number of microchannels, and therefore, the production rate.

For example, the emulsion exit port of the second channel is configured to connect a tank to collect the emulsion.

For example, such device can be used to produce drops to synthetize functionalized solid particles which can be useful in the biotechnology field.

According to an example embodiment, the device comprises two arrays of microchannels.

According to an example embodiment, one array of microchannels is set on both sides of at least one of the first channel or the second channel.

For example, the device can comprise at least two of the first channels, a first array of microchannels of the two arrays of microchannels being situated between a first of the two first channels and the second channel, and a second array of microchannels of the two arrays of microchannels being situated between a second of the two first channels and the second channel. In other words, in such a case, there is only one second channel with one array of microchannels set on both sides, and then one first channel on both sides too.

Or for example, the device can comprise at least two of the second channels, a first array of microchannels of the two arrays of microchannels being situated between a first of the two second channels and the first channel, and a second array of microchannels of the two arrays of microchannels being situated between a second of the two second channels and the first channel. In other words, in such a case, there is only one first channel with one array of microchannels set on both sides, and then one second channel on both sides too.

The first part of the second channel has a height h2$a$.

For example, the height h2$a$ of the first part of the second channel is from 2 to 100 times greater than the height h0 of a microchannel, preferably 10 times.

For example, h2$a$ is equal to about 20 μm.

For example, the height h2$b$ of the second part of the second channel is from 2 to 100 times greater than the height h2$a$ of the first part of the second channel, preferably 10 times.

For example, h2$b$ is equal to about 200 μm.

The first channel has a height h1.

For example, the height h1 of the first channel is from 2 to 1 000 times greater than the height h0 of a microchannel, for example 10 times.

According to an example, the height h1 of the first channel is equal to the height h2$a$ of the first part of the second channel.

For example, h1 is equal to about 20 μm.

For example, the first channel has a width comprised between 1 to 100 times its height h1.

For example, the second channel has a width comprised between 1 to 100 times the height h2$b$ of its second part.

For example, the first part of the second channel has a width between 1 and 100 times the height h2$a$, preferably 10 times; the width of the first part of the second channel designates the dimension of the first part of the second channel extending from the microchannels to the second part of the second channel.

The microfluidic device is advantageously made of glass, since glass is compatible with most solvents, and thus it is possible to use more varied emulsion formulations.

Also, microfabrication techniques using glass substrates lead to accurate and reproducible microchannel features.

According to another advantageous example, the device can be made of silicon.

For example, to limit, or even prevent, wetting of the glass by the phase to be dispersed, particularly when it comprises an organic phase, and ensure an efficient emulsification step, it is desirable that at least some of the surfaces of the first channel, the second channel, and/or the microchannels are hydrophilic (or hydrophobic), and remain hydrophilic (or hydrophobic) as long as possible during the emulsion production.

Moreover, according to an interesting option, the surface properties can be modified to make them hydrophilic or hydrophobic, depending on the type of emulsion to produce.

To this end, according to one embodiment, a hydrophilic molecule is adsorbed or grafted in at least part of the surfaces of the first channel, and/or the second channel, and/or the microchannel, to make the surface hydrophilic, or a hydrophobic molecule is adsorbed or grafted in at least part of the surfaces of the first channel, and/or the second channel, and/or the microchannel, to make the surface hydrophobic.

If possible, a hydrophilic, or a hydrophobic, molecule is applied to the whole surface of the first channel, the second channel and the microchannels.

The hydrophilic or hydrophobic molecule can be characterised by high adhesion energy to the surface.

According to an embodiment, the hydrophilic or hydrophobic molecule can be a polymer.

An interesting hydrophilic molecule can be a silane coupled with Poly(ethylene glycol) (PEG), in particular for a device made of glass or silicon for example.

An interesting hydrophobic molecule can be a silane, for example a silane coupled with an organic compound, for example an organofunctional alkoxysilane, like octadecyltrichlorosilane, in particular for a device made of glass or silicon for example.

A related method can be as follows.

For example, the surface is activated with a piranha solution, i.e. a solution comprising sulphuric acid with hydrogen peroxide ($H_2O_2$).

Next, the surface is rinsed and after, the surface is functionalized with a hydrophilic or hydrophobic solution.

For example, the hydrophilic or hydrophobic molecule that prevents wetting of the organic phase is adsorbed on the surface.

For example, the hydrophilic or hydrophobic molecule which prevents wetting of the organic phase is covalently bonded on the surface.

According to one example embodiment, several devices comprising at least some of the above-mentioned features, can be placed and used in parallel.

This can further increase the production rate of an emulsion.

For example, a manufacturing method of such a device, comprising at least some of the above-mentioned features, can comprise the following steps:

Providing a plate, called here bottom plate;

Forming at least a part of the first channel, and/or the second channel, and/or the microchannels in the bottom plate;

Assembling the bottom plate with a plate, here called top plate, to form the device.

For example, at least part of the first channel, and/or the second channel, and/or the microchannels can be formed by etching, wet or dry, or soft lithography or by 3D printing techniques, like stereolithography.

According to an example embodiment, the method can also comprise a step of forming a complementary part of the first channel, the second channel, and/or the microchannels in the top plate.

For example, the complementary part of the first channel, and/or the second channel, and/or the microchannels can be formed by etching, wet or dry, or soft lithography or by 3D printing techniques, like stereolithography.

This step preferably occurs before assembling the top plate with the bottom plate.

For example, etching the bottom plate and/or the top plate can comprise anisotropic etching.

For example, etching the bottom plate and/or the top plate can comprise isotropic etching.

Of course, many other techniques may be utilized.

Besides, different techniques can be applied to the bottom plate and the top plate configured to be assembled one to the other if required.

According to another embodiment, the second part of the second channel can be formed by etching a glass substrate (top plate and/or bottom plate) to obtain a half-cylinder, or a triangle if the substrate is made of silicon (making the top plate and/or the bottom plate).

According to another embodiment, at least part of the device can also be made by 3D printing methods, for example stereolithography, enabling different shapes to be provided.

BRIEF DESCRIPTION OF THE DRAWINGS

Additional features and advantages of the present invention are described in, and will be apparent from, the description of the presently preferred embodiments which are set out below with reference to the drawings in which:

FIG. 1 diagrammatically shows a cross section of a microfluidic device 1 according to prior art.

FIG. 2A diagrammatically shows a cross section of a microfluidic device 100 according to the present invention.

FIG. 2B illustrates an experimental manufacture and use of a device according to FIG. 2A.

FIG. 3A shows a diagram of a microfluidic device 100' for producing an emulsion according to a first embodiment compliant with the one of FIG. 2A (FIG. 3A), and FIG. 3B shows a corresponding cross-section along the dotted line A-A.

FIGS. 4A to 4I, illustrates various methods to manufacture channels or microchannels in a device according to the invention.

DETAILED DESCRIPTION OF THE INVENTION

Figure 4:
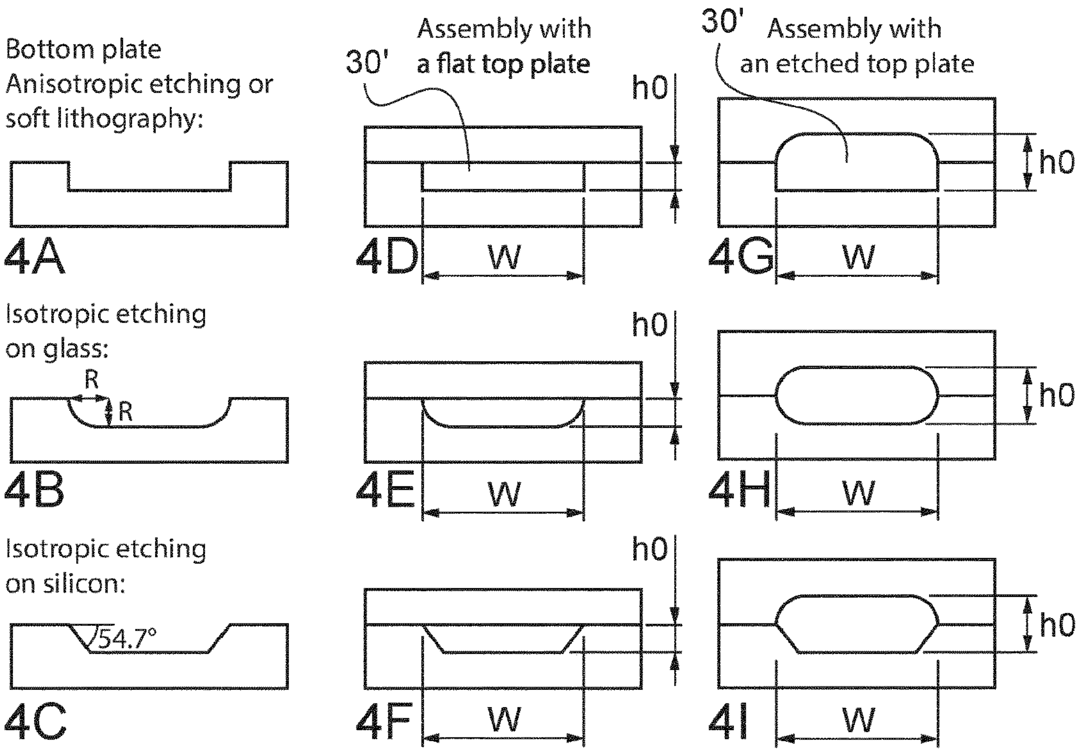
FIG. 4, comprising

FIG. 1 diagrammatically shows a cross section of a microfluidic device 1 according to prior art.

This device 1 comprises a first channel 1*a*, a second channel 1*b*, and microchannel 1*c*, linking the first channel to the second channel.

In use, a phase to be dispersed 2*a*, for example including at least an organic phase, is injected into the first channel 1*a*. The phase to be dispersed 2*a* passes through the microchannels 1*c* and forms a drop 2*b* at an end of the microchannel meeting the second channel 1*b*. In the second channel 1*b*, a continuous phase 2*c*, for example an aqueous phase, is injected and moves the drops 2*b* to an emulsion exit port of the device.

The drops 2*b* in the continuous phase 2*c* form an emulsion.

According to such embodiment, the microchannel 1*c* has a height h0 which is smaller than a height h1 of the first channel 1*a* and a height h2 of the second channel 1*b*.

As illustrated on FIG. 1, the second channel 1*b* has a uniform height.

A drawback of such embodiment is that the device, in particular at least the second channel 1*b*, can be easily clogged, and monitoring a continuous flow of the emulsion is difficult.

FIG. 2A diagrammatically shows a cross section of a microfluidic device 100 according to the invention.

This device 100 comprises a first channel 10, a second channel 20, and a microchannel 30, linking the first channel 10 to the second channel 20.

In use, a phase to be dispersed 2*a*, for example including at least an organic phase, is injected into the first channel 10. The phase to be dispersed 2*a* passes through the microchannel 30 and forms a drop 2*b* at an outlet 34 of the microchannel meeting the second channel 20. In the second channel 20, a continuous phase 2*c*, for example an aqueous phase, is injected and moves the drops 2*b* to an emulsion exit port of the device. More particularly, the continuous phase preferably flows transversely to a flow of the drops getting out the microchannels.

The drops 2*b* in the continuous phase 2*c* form an emulsion.

In this embodiment, the second channel 20 comprises a first part 21 which the outlet 34 of the microchannel 30 meets, and a second part 22, the first part 21 being between the microchannel 30 and the second part 22.

According to such embodiment, the microchannel 30 has a height h0 which is smaller than a height h1 of the first channel 10. Besides, the first part 21 of the second channel has a height h2*a* greater than the height h0 of the microchannel, and the second part 22 of the second channel has a height h2*b* greater than the height h2*a* of the first part 21 of the second channel.

According to a particular embodiment, h0=2 μm, h2*a*=20 μm, and h2*b*=200 μm.

According to a particular embodiment, the width of the first channel is 500 μm, the width of the first part of the second channel 21 is 200 μm, and the width of the second part of the second channel 22 is 1600 μm.

FIG. 2B illustrates an experimental manufacture of a device according to FIG. 2A.

According to an example of utilization of the device, a phase to be dispersed 2*a* is introduced in the first channel and flows through the microchannels 30.

In parallel, a continuous phase 2*c*, potentially comprising an aqueous phase, is introduced in the second channel 20, as illustrated by the arrow.

Thus this shows that the continuous phase 2*c* flows transversely to the arrival of the drops coming from the microchannels 30.

FIG. 2B also shows that the emulsion is compact in the first part 21 of the second channel 20, and is then diluted in the second part 22 of the second channel 20, which ensures a better continuous flow, and therefore a more continuous production of the emulsion.

A—First Device

A diagram of a microfluidic device 100' for producing an emulsion is shown in FIGS. 3A and 3B (cross-section along the dotted line A-A) according to a first embodiment, compliant with the principle of FIG. 2A.

In one embodiment, the dimensions of the microfluidic parts of such microfluidic device 100' can be about 10 cm (length L0)×1 cm (width W0). For example, the height of the device would be the biggest height amongst h1, h2*b*.

Microfluidic device 100' comprises a first channel 10', a second channel 20', and two facing arrays 31',32' of microchannels 30' linking the first channel 10' to the second channel 20'.

In one embodiment, each array 31',32' comprises 1 000 microchannels 30'.

Each microchannel 30' has an inlet 33' from the first channel 10' and an outlet 34' to the second channel 20' (see FIG. 3B).

The second channel 20' is, in the present invention, centrally positioned in the device between the two arrays of microchannels 30'.

Besides, it is straight here.

The second channel 20' comprises an entry port 23' for the continuous phase, and an exit port 24' for the emulsion formed by using the device. In use, the continuous phase flows form the entry port 23' towards the exit port 24' where the emulsion is collected.

As shown in FIG. 3B, the second channel 20' is characterized by two different heights (h2*a* and h2*b*): a first part 21' with the smallest of the two heights (h2*a*) located along the arrays of microchannels 30', and a second part 22' with the biggest of the two heights (h2*b*), here located in the center of the second channel 20'. Thus, the second channel 20' here comprises two first parts 21' and the second part 22' is located between the two first parts 21'.

Here, a lengthwise direction L0 of the device is considered to be the direction of a flow along the second channel 20'.

The first channel 10' here comprises an entry port 13' for the phase to be dispersed, and an exit port 14' for the phase to be dispersed which is configured to be open or closed.

When the exit port 14' for the phase to be dispersed is closed, the phase to be dispersed is forced through the arrays of microchannels 30' that lead to the second channel 20' where the continuous phase flows from the entry port 23' towards the emulsion exit port 24' where the emulsion is collected.

Thus, the continuous phase in the second channel 20' flows transversely to the flow of drops coming from the microchannels 30.

In the embodiment of FIG. 3A, the first channel 10' is split in two parts 11',12', the first array 31' of microchannels 30' being situated between a first part 11' of the two parts of the first channel 10' and the second channel 20', and the second array 32' of microchannels 30' being situated between a second part 12' of the two parts of the first channel 10' and the second channel 20'.

Therefore, here, the two parts 11',12' of the first channel 10' surround the two arrays 31',32' of microchannels 30' and the second channel 20'.

Here, height h1 of the first channel 10' (in particular here of both parts 11',12') and height h2*a* of the first parts 21' of the second channel 20' are equal to 20 μm, height h0 of the microchannel 30' is equal to 2 μm, and height h2*b* of the second part 22' of the second channel 20' is equal to 200 μm.

Here, the width of the first channel 10' is 500 μm, the width of the first part of the second channel 21' is 200 μm, and the width of the second part of the second channel 22' is 1600 μm.

Besides, each microchannel 30' has a length L, and at least a part with a width W (considered along the lengthwise direction of the device).

For example, the width W is equal to about 10 μm, and the length (considered between its inlet and its outlet) is equal to about 140 μm.

A distance e between two successive microchannels 30' is for example equal to 40 μm.

A microfluidic device with a design as shown in FIGS. 3A and 3B is advantageously made of glass.

According to an example, the channels can be made by a wet etching method leading to bottom corners of channels having a rounded shape characterized by a radius of curvature equal to the channel's height.

Various example methods to manufacture a device according to the invention are illustrated in FIG. 4.

For example, a device according to the invention can be made by assembling a bottom plate with a top plate.

At least part of the first channel, the second channel, and/or the microchannels can be formed in at least the bottom plate.

For illustration, FIG. 4 shows a microchannel cross-section.

To this end, the following techniques can be used:

- Anisotropic etching or soft lithography, which usually lead to a rectangular cross section with right angle corners as shown in FIG. 4A),
- Isotropic etching, which usually leads to:
  - rounded corners when applied on a glass substrate as illustrated in FIG. 4B),
  - beveled corners when applied on a silicon substrate as illustrated in FIG. 4C).

The top plate with which it is then assembled can be flat, as illustrated in FIGS. 4D), 4E) and 4F), or etched too, as illustrated in FIGS. 4G), 4H) and 4I).

The bottom plate and the top plate assembled one to the other can be etched with different techniques if desired.

According to another embodiment, 3D printing, for example stereolithography, could also be used to manufacture at least part of the device.

Figure 5:
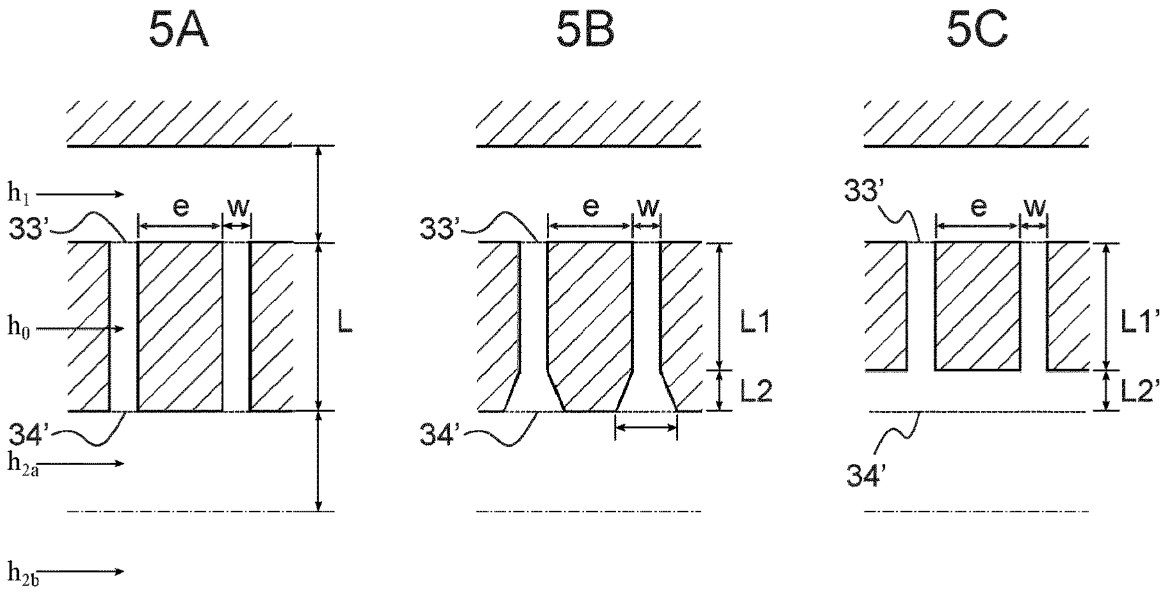
FIG. 5 shows three embodiments of microchannels according to the invention.

As illustrated in FIG. 5, microchannels can have different shapes along their length.

According to one embodiment, FIG. 5A shows microchannels having a constant width W along their length L.

According to a second embodiment, FIG. 5B shows microchannels having a first part with a constant width W along their length L1 and a second part which is flared along their length L2.

According to a third embodiment, FIG. 5C shows microchannels having a first part with a constant width W along their length L1' and a second part which is common to several microchannels along their length L2', corresponding to coalescence of several microchannels.

The second parts of the microchannels have a same height h0.

1. First Emulsion Production Example

The phase to be dispersed 2*a* is decane (which is an alkane composed of a linear chain of ten atoms of carbon (C)), the continuous phase 2*c* is water with sodium dodecyl sulphate.

The flows of both phases are controlled by imposing a pressure on each reservoir containing the liquids and which are connected to the corresponding entry ports of the microfluidic device.

Figure 6:
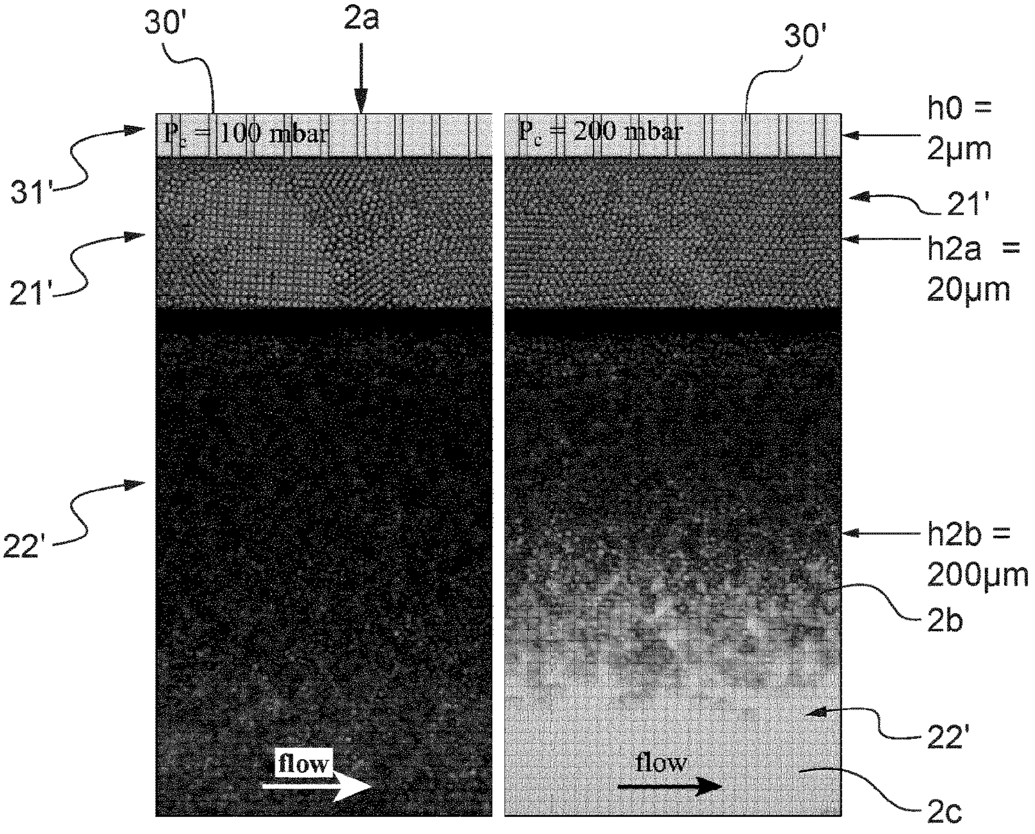
FIG. 6 shows snapshots of a microfluidic device according to the embodiment of FIG. 3A that produces emulsion for two different pressures (Pc) of the continuous phase while the pressure of the phase to be dispersed is set to 500 mbar. The heights of the different channels are indicated.

As shown in FIG. 6, oil-in-water drops 2*b* are formed at the end of the microchannels 30', forming a compact emulsion having homogeneous size as revealed by the arrangement of the drops in a crystal like fashion.

The compact emulsion then flows to the central part 22' of the collecting second channel 20' having a greater height and where most of the continuous phase 2*c* flows.

This makes it possible to dilute the emulsion and thus to obtain a continuous production and collection of the emulsion at a high throughput.

The snapshots provided in FIG. 6 are taken at the end of the microchannel array for two different pressures (Pc) of the continuous phase 2*c*, namely Pc=100 mbar for the left hand picture, and Pc=200 mbar for the right hand picture. The pressure (Pd) of the phase to be dispersed 2*a* is set to 500 mbar.

FIG. 6 clearly shows that the collected emulsion is more diluted for a higher value of Pc.

The production rate depends mainly on the pressure (Pd) of the phase to be dispersed and weakly on the pressure (Pc) of the continuous phase thanks to the design of the microfluidic device according to the invention.

Figure 7:
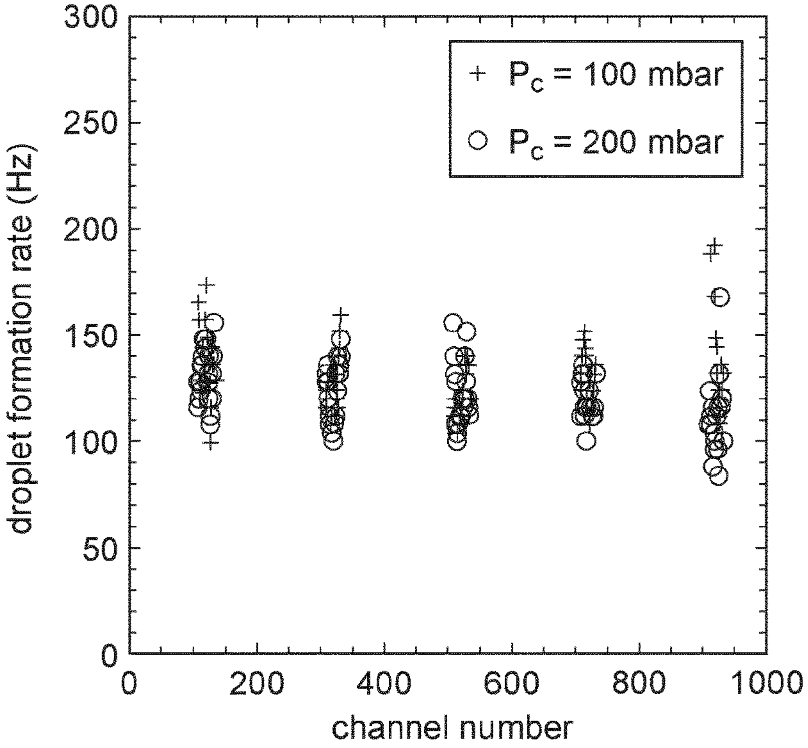
FIG. 7 represents frequency of drops formation as a function of the microchannel's number along the array of microchannels of a glass device according to the embodiment of FIG. 3A and the experiment of FIG. 6.

The production rates of about twenty microchannels at five locations along the array of microchannels of a glass device as shown in FIGS. 3A and 3B are shown in FIG. 7.

The first microchannel is located close to the entry port of the continuous phase. Two pressures of the continuous phase (Pc) are used as in FIG. 6. The pressure of the phase to be dispersed is set to 500 mbar.

As reported in FIG. 7, the frequency of drop formation along the array of microchannels is not affected by a modification of Pc.

The average frequency of drop formation per microchannel is about 130 Hz. This results in an overall production rate of the device of $2.6\times10^5$ drops per second.

Figure 8:
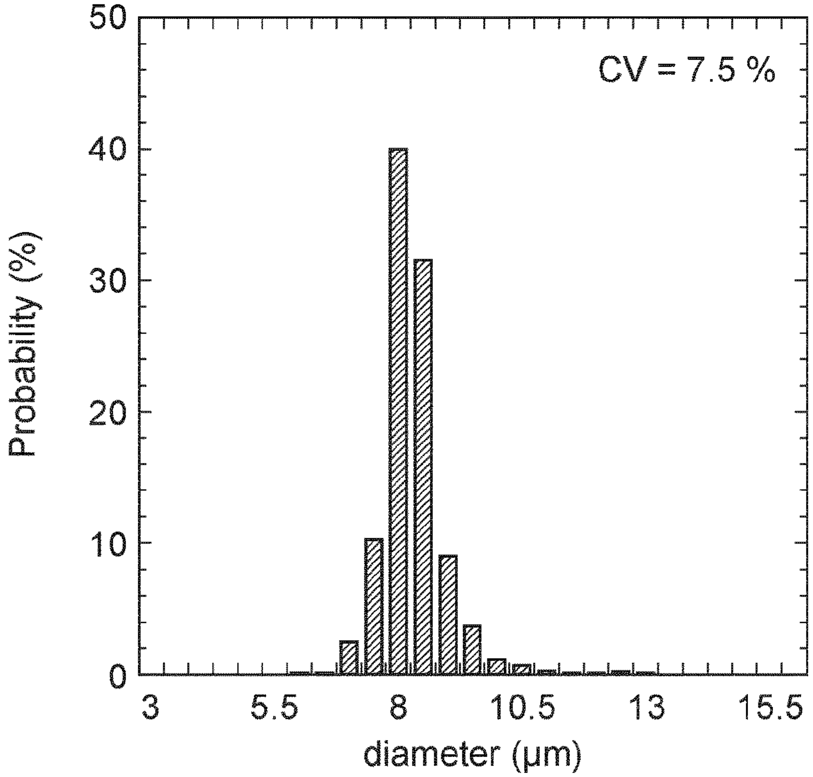
FIG. 8 illustrates a drop size distribution of an emulsion produced with a device according to FIG. 3A with decane as a phase to be dispersed.

The average drop size is 8.5 μm and the corresponding coefficient of variation (CV), defined as the standard deviation of the size distribution divided by the mean size, is 7.5% (as illustrated by FIG. 8).

The corresponding throughput is 0.3 mL of phase to be dispersed per hour.

The microfluidic device can continuously produce emulsion drops over several days or weeks.

2. Second Emulsion Production Example

The phase to be dispersed 2*a* is a certified refractive index liquid (Series AA-xx with n=1.41, #1806Y, from Cargille Laboratories) and the continuous phase 2*c* is an aqueous solution of sodium dodecyl sulphate (SDS).

For a set of pressures, the average frequency of drop formation per microchannel is 90 Hz and the resulting drop size is 8.4 μm and the size distribution is characterized by a coefficient of variation of 4.8%.

3. Third Emulsion Production Example

Still using device of FIG. 3, the phase to be dispersed 2*a* comprises styrene, divinylbenzene, and nanoparticles of iron oxide covered by oleic acid; and the continuous phase 2*c* is water with of sodium dodecyl sulphate.

For a set of pressures, the average frequency of drop formation per microchannel is 30 Hz and the resulting mean drop size is 8.2 μm and the size distribution is characterized by a coefficient of variation of 7.2%.

B—Second Device

Figure 9:
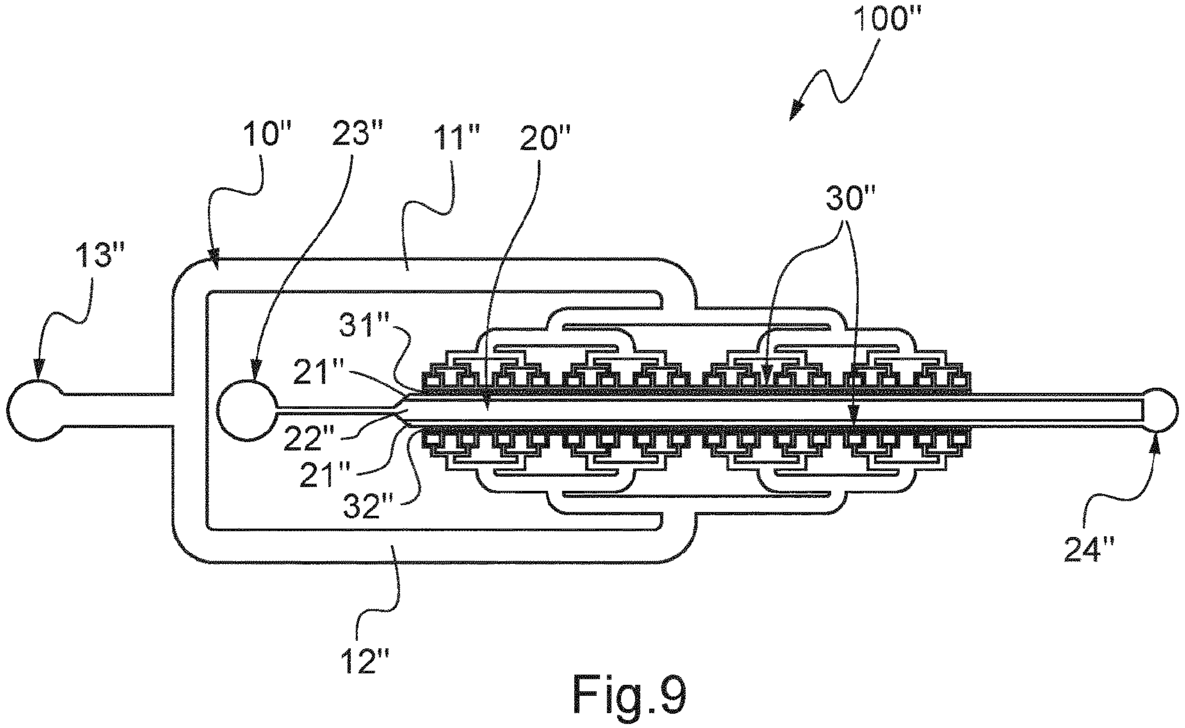
FIG. 9 diagrammatically shows a microfluidic device according to a second embodiment of the invention.

A microfluidic device 100" according to a second embodiment of the invention is shown in FIG. 9.

Similar parts bear same numeral reference with an additional “"”.

The device 100" differs from the previous one illustrated on FIG. 3 by the design of the first channel 10", which is here made tortuous and split into several sub-channels, and in that there is no exit port for the phase to be dispersed in the first channel.

For example, the device 100" is fabricated by soft lithography techniques.

It is made in polydimethylsiloxane (PDMS) and bonded on a glass plate.

In one embodiment, the height of the microchannels (h0) is 2.3 μm, the width W is 10 μm and the length L is 140 μm, the height of the first channel (h1) and of each first part of the second channel (h2*a*) is 20 μm and the height (h2*b*) of the second part of the second channel (collecting channel) is 240 μm.

Here, the width of the first part of the second channel 21" is 490 μm, and the width of the second part of the second channel 22" is 1600 μm.

Each array contains 500 microchannels, or a total of 1000 microchannel for the device.

An emulsion composed of fluorocarbon oil (FC40, 3M Fluorinert) as the phase to be dispersed 2*a* and an aqueous solution of sodium dodecyl sulphate as the continuous phase 2*c* is produced with the microfluidic device reported in FIG. 9.

Figure 10:
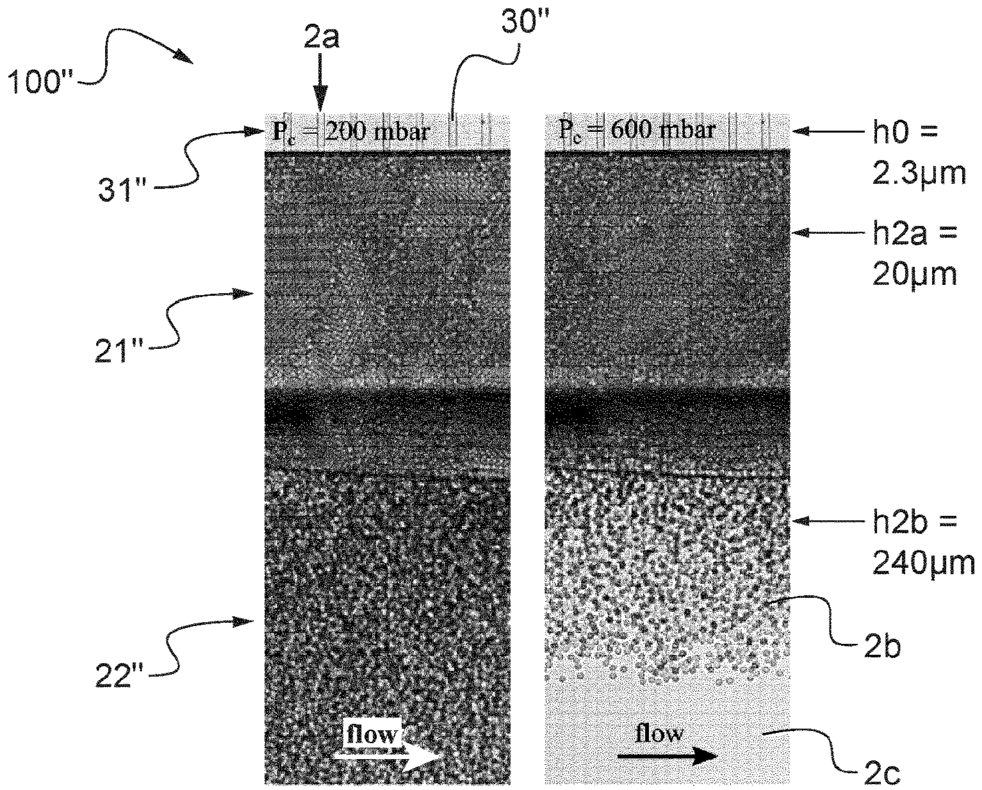
FIG. 10 shows snapshots of a microfluidic device according to the embodiment of FIG. 9 that produces emulsion for two different pressures (Pc) of the continuous phase. The pressure of the phase to be dispersed is set to 350 mbar. The heights of the different areas are also indicated.

FIG. 10 shows snapshots taken at the end of the microchannel array for two different pressures (Pc) of the continuous phase 2*c*, namely Pc=200 mbar for the left hand picture, and Pc=600 mbar for the right hand picture. The pressure (Pd) of the phase to be dispersed is set to 350 mbar.

As shown in this figure, the oil-in-water drops 2*b* are formed at the end of the microchannels 30", forming a compact emulsion having homogeneous size as revealed by the arrangement of the drops 2*b* in a crystal like fashion.

The compact emulsion then flows to the central part 22" of the collecting second channel 20" having a higher height and where most of the continuous phase 2*c* is flowing. This makes it possible to dilute the emulsion and thus to obtain a continuous production and collection of the emulsion at a high throughput.

It is clearly visible that the collected emulsion is more diluted for a higher value of Pc.

Figure 11:
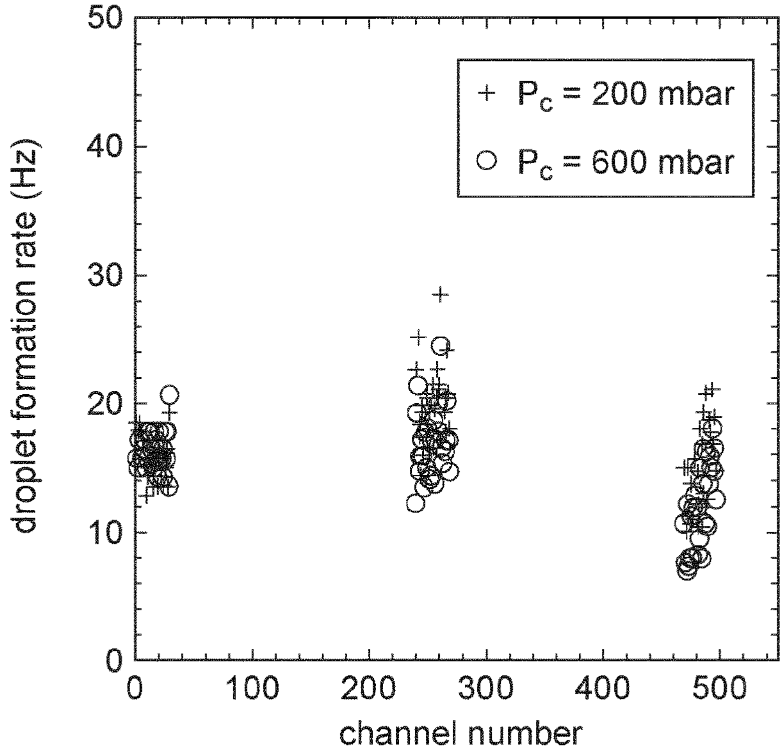
FIG. 11 shows frequency of drops formation as a function of the microchannel's number along the array of microchannels of a PDMS (polydimethylsiloxane) device according to the embodiment of FIG. 9. The first microchannel on the abscissa corresponds to a microchannel which is located close to the entrance of the continuous phase. Two pressures of the continuous phase (Pc) are used as in FIG. 10. The pressure of the phase to be dispersed is set to 350 mbar.

FIG. 11 shows the production rate of about twenty microchannels at three locations along the array of microchannels 30" of the PDMS device 100" shown in FIG. 9.

The first microchannel 30" is located close to the entry port 23" of the continuous phase 2*c*.

As illustrated by this figure, the frequency of drop formation along the array of microchannels 30" is not affected by a modification of Pc.

The invention claimed is:

1. An emulsion production microfluidic device which comprises:

A first channel, comprising an entry port configured to inject a phase to be dispersed into the first channel, A second channel, comprising an entry port configured to inject a continuous phase into this second channel, and an emulsion exit port configured to extract an emulsion from the device, and At least one array of microchannels, arranged side by side, each microchannel comprising an inlet from the first channel, and an outlet to the second channel, a height h0 of each of the microchannels being smaller than a height h1 of the first channel, wherein the second channel comprises a first part connected to the outlet of each microchannel and at least a second part along the first part, the first part being between the array of microchannels and the second part, the first part having a height h2*a* greater that the height h0 of each microchannel, and the second part having a height h2*b* greater than the height h2*a* of the first part.

2. Device according to claim 1, wherein at least one microchannel comprises at least a part with a constant width W.

3. Device according to claim 2, wherein the width W of at least a part of a microchannel, is comprised between 0.01 to 10,000 times the height h0.

4. Device according to claim 3, wherein at least one microchannel comprises a flared part.

5. Device according to claim 3, wherein the array of microchannels comprises a part which is common to at least two microchannels at the outlet location.

6. Device according to claim 3, wherein the array of microchannels comprises at least 10 microchannels.

7. Device according to claim 2, wherein at least one microchannel comprises a flared part.

8. Device according to claim 2, wherein the array of microchannels comprises a part which is common to at least two microchannels at the outlet location.

9. Device according to claim 2, wherein the array of microchannels comprises at least 10 microchannels.

10. Device according to claim 1, wherein at least one microchannel comprises a flared part.

11. Device according to claim 10, wherein the array of microchannels comprises a part which is common to at least two microchannels at the outlet location.

12. Device according to claim 10, wherein the array of microchannels comprises at least 10 microchannels.

13. Device according to claim 1, wherein the array of microchannels comprises a part which is common to at least two microchannels at the outlet location.

14. Device according to claim 1, wherein the array of microchannels comprises at least 10 microchannels.

15. Device according to claim 1, wherein the height h2*a* of the first part of the second channel is from 2 to 100 times greater than the height h0 of a microchannel.

16. Device according to claim 1, wherein the height h2*b* of the second part of the second channel is from 2 to 100 times greater than the height h2*a* of the first part of the second channel.

17. Device according to claim 1, wherein the height h1 of the first channel is from 2 to 1000 times greater than the height h0 of a microchannel.

18. Device according to claim 1, wherein the first channel has a width comprised between 1 to 100 times the height h1.

19. Device according to, claim 1, wherein the second channel has a width comprised between 1 to 100 times the height h2*b* of the second part.

20. Device according to, claim 1, wherein a hydrophilic molecule is adsorbed or grafted in at least part of the surfaces of the first channel, and/or the second channel, and/or the microchannel, to make the surface hydrophilic, or a hydrophobic molecule is adsorbed or grafted in at least part of the surfaces of the first channel, and/or the second channel, and/or the microchannel, to make the surface hydrophobic.

* * * * *